United States Patent [19]

Kurokawa

[11] Patent Number: 4,811,111
[45] Date of Patent: Mar. 7, 1989

[54] FACSIMILE MACHINE HAVING A FUNCTION OF TRANSMITTING SOURCE AND DESTINATION INFORMATION

[75] Inventor: Shunji Kurokawa, Ebina, Japan

[73] Assignee: Ricoh Company, Ltd., Tokyo, Japan

[21] Appl. No.: 72,013

[22] Filed: Jul. 10, 1987

[30] Foreign Application Priority Data

Jul. 12, 1986 [JP] Japan ............................ 61-164222

[51] Int. Cl.$^4$ ............................................. H04N 1/32
[52] U.S. Cl. ...................................... 358/257; 379/100
[58] Field of Search ........................ 358/257; 379/100

[56] References Cited

U.S. PATENT DOCUMENTS

| | | | |
|---|---|---|---|
| 4,255,766 | 3/1981 | Matsuda | 358/257 |
| 4,583,124 | 4/1986 | Tsuji | 379/100 |
| 4,646,160 | 2/1987 | Iizuka | 358/257 |

Primary Examiner—Howard W. Britton
Attorney, Agent, or Firm—Oblon, Fisher, Spivak, McClelland & Maier

[57] ABSTRACT

A facsimile machine is provided with a memory which stores a plurality of destination station information indicating the identity of each of plurality of destination stations. When a one-touch key is depressed, the corresponding telephone number is automatically dialed to establish a communication path with the selected destination station. Then, the source station information indicating the identity of the source station which transmits image data and the destination station information which is supposed to receive the image data are transmitted from the source station to the destination station prior to transmission of the image data, so that the source and destination station information may be indicated at top of a hard copy produced at the destination station.

5 Claims, 3 Drawing Sheets

FACSIMILE MACHINE HAVING A FUNCTION OF TRANSMITTING SOURCE AND DESTINATION INFORMATION

BACKGROUND OF THE INVENTION

1. Field of the Invention

This invention generally relates to a facsimile machine which stores a plurality of destination information, such as facsimile telephone numbers, which are often used, and, in particular, to a facsimile machine which transmits source information indicating the identity of transmission source and also destination information to which data is to be transmitted.

2. Description of the Prior Art

A facsimile machine capable of transmitting the source information identifying the source of transmission of data prior to the transmission of documentary data is well known in the art as disclosed in the U.S. Pat. No. 4,419,697 issued to Wada on Dec. 6, 1983 and assigned to the assignee of this application, which is hereby incorporated by reference. In addition a facsimile machine capable of storing a plurality of facsimile telephone numbers is also known. In this case, a plurality of facsimile telephone numbers to be stored are normally selected depending on the frequency of use. In such a facsimile machine, provision is normally made of a plurality of one-touch selection keys one of which is selectively depressed to select one of the stored facsimile telephone numbers, thereby leaving the burden of dialing or pushing buttons for the entire facsimile telephone number of a destination station to which a facsimile data is to be transmitted.

However, when transmitting one or more of original documents, the operator normally prepares a transmission cover sheet and writes down or types the name, address and facsimile telephone number of the destination station to which the image data of the original documents is to be transmitted. The usage of such an extra cover sheet is disadvantageous because it requires an additional transmission time which thus increases cost of transmission. Moreover, if the transmission is interrupted for some reason in the middle of transmission of a plurality of document sheets following the cover sheet, the operator must prepare another cover sheet to transmit the remaining document sheets because there might be another transmission from a different source station.

SUMMARY OF THE INVENTION

In accordance with the present invention, there is provided a facsimile machine capable of storing a plurality of destination information, including a facsimile telephone number. When transmitting an original document, not only source information but also destination information are transmitted in advance to a destination station. Thus, in the preferred embodiment, both of the source and destination information are printed at the beginning of each page at the destination station. Since both of the source and destination information are printed at each page, there is no need for the operator to use a transmission cover sheet, thereby greatly facilitating the transmission operation of a facsimile machine.

It is therefore a primary object of the present invention to obviate the disadvantages of the prior art as described above and to provide an improved facsimile machine capable of transmitting not only source (transmitter) information but also destination (or receiver) information.

Another object of the present invention is to provide an improved facsimile machine capable of storing a plurality of destination information including facsimile telephone numbers and character data, such as name and/or address.

A further object of the present invention is to provide an improved facsimile machine having a significantly increased convenience in transmission operation.

A still further object of the present invention is to provide an improved facsimile machine capable of minimizing the transmission time and thus the telephone charges.

Other objects, advantages and novel features of the present invention will become apparent from the following detailed description of the invention when considered in conjunction with the accompanying drawings.

DESCRIPTION OF THE PREFERRED EMBODIMENTS

Figure 1:
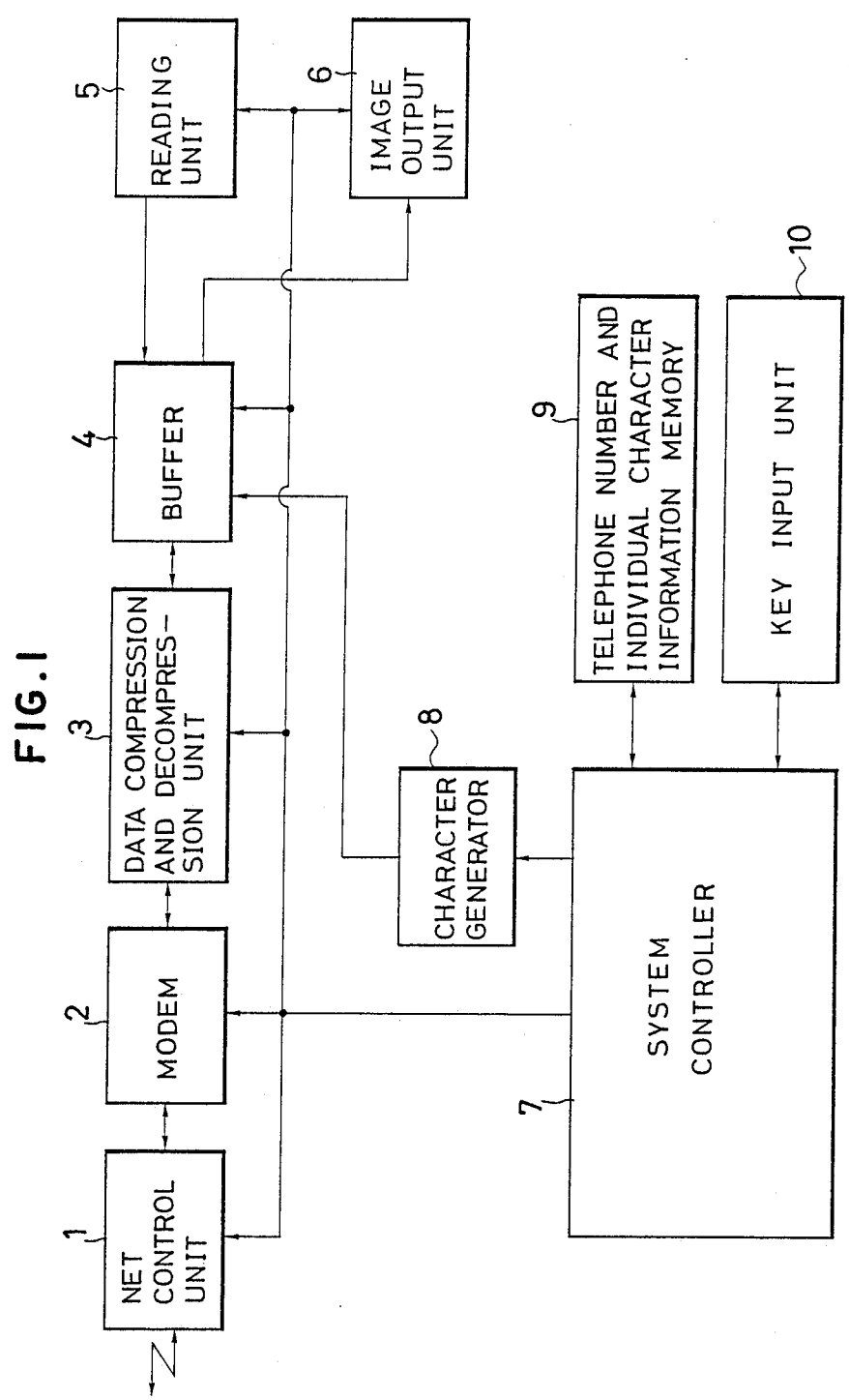
FIG. 1 is a block diagram showing the overall structure of a facsimile machine constructed in accordance with one embodiment of the present invention.

Referring to FIG. 1, there is shown in block form a facsimile machine constructed in accordance with one embodiment of the present invention. As shown, the present facsimile machine includes a net control unit 1, a MODEM 2, a data compression and decompression unit 3, a buffer 4, a reading unit 5, an image output unit 6, a system controller 7, a character generator 8, a telephone number and individual character information memory 9, and a key input unit 10. It is to be noted that the main feature of the present facsimile machine resides in the additional provision of the character generator 8 and the telephone number and individual character information memory 9.

In the structure shown in FIG. 1, the net control unit 1 controls a connection to a transmission line, typically public telephone line. The MODEM 2 modulates facsimile data to be transmitted according to the characteristics of the transmission line and also demodulates the received facsimile data. The data compression and decompression unit 3 encodes facsimile data, for example, by the MH or MR method to have it compressed before transmission and decodes the received facsimile data after demodulation by the MODEM 2 to thereby recover the original facsimile image data. The buffer 4 is typically comprised of a semiconductor memory and it serves to temporarily store facsimile image data. The reading unit 5 is typically comprised of an image sensor, such as a CCD line sensor, which includes a plurality of photo-electric elements arranged in the form of a single array, which defines the so-called main scanning direction. An original document to be transmitted is optically read by the reading unit 5 in the form of raster scanning, and thus there is produced a relative motion between the reading unit 5 and the original document in the so-called auxiliary scanning direction perpendicular to the main scanning direction. The reading unit 5 optically reads the original document to convert a visual original image into an electrical image signal which is temporarily stored in the buffer 4.

The image output unit 6 typically includes a recording device, such as a thermal printer or a laser printer, which produces a hard copy of the received image data stored in the buffer 4. The system controller 7 is typically comprised of a microcomputer for controlling the overall operation of the present facsimile machine. The character generator 8 is provided between the buffer 4 and the system controller 7 and it carries out conversion between a code of a character and image data of the corresponding character. In the preferred embodiment, when the telephone number and individual character information of one of destinations stored in the telephone number and individual character information memory 9 has been selected by the operator, the individual character information of the selected destination, which is typically a series of character codes, is supplied to the character generator 8 under the control of the system controller 7, so that the character generator 8 supplies the character pattern data corresponding to the selected individual character information to the buffer 4 as facsimile image data.

The telephone number and individual character information memory 9 stores a plurality of destination information, each including a facsimile telephone number and individual character data indicating the I.D. of the destination, such as the name and address. Each of these plurality of destination information may be selected by depressing a corresponding one of a plurality of one-touch keys or by dialing a corresponding one of abbreviated code numbers which have been previously determined and stored. The key input unit 10 includes a plurality of numeric keys, typically including "0" through "9" numeric keys and other symbolic keys, which may correspond to those keys typically used in push telephones and it may also include additional keys, such as one-touch keys, if desired. By pushing the keys provided in the key input unit 10 selectively, the destination information to which data is to be transmitted is selected.

Figure 2:
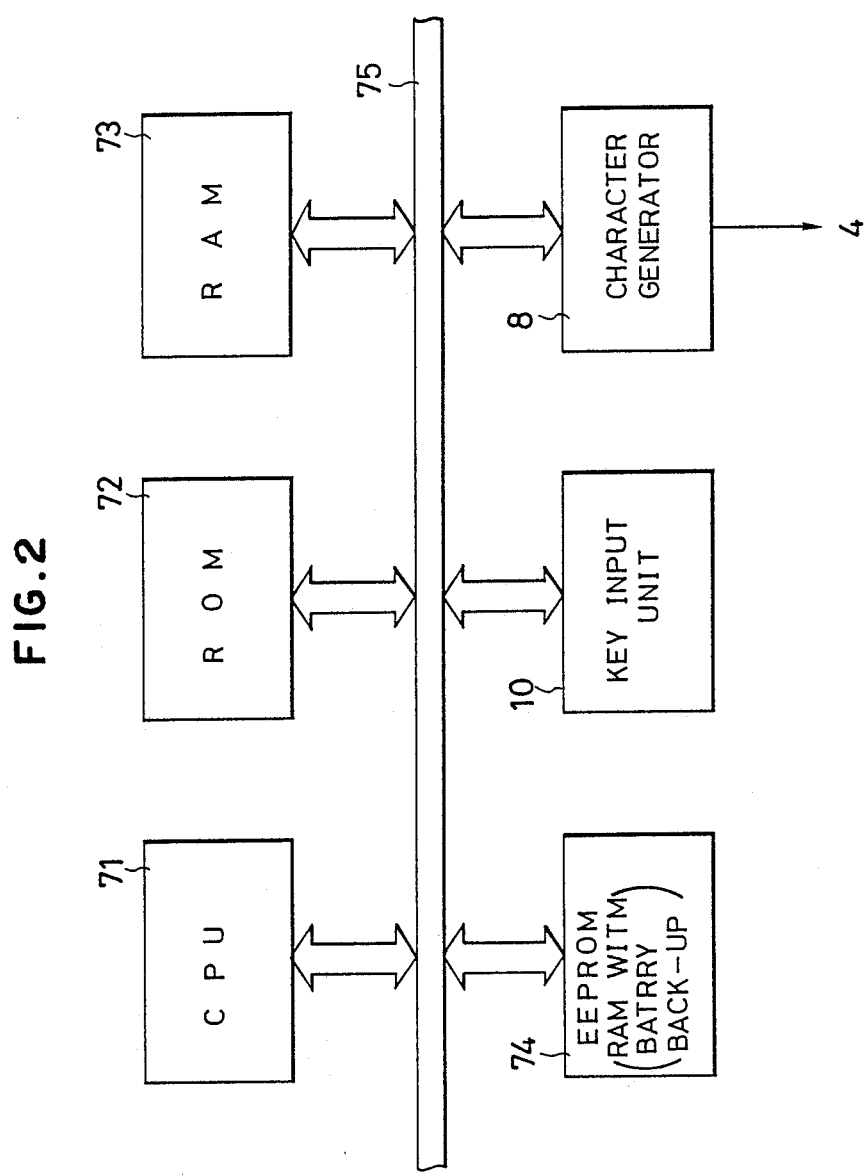
FIG. 2 is a block diagram showing the detailed structure of a part of the structure shown in FIG. 1.

FIG. 2 shows a part of the facsimile machine of FIG. 1 in detail in the case when the system controller 7 shown in FIG. 1 is constructed by using a microcomputer. It is to be noted that identical numerals indicate identical elements between FIGS. 1 and 2. As shown, the structure shown in FIG. 2 includes a central processing unit 71 or CPU for short, a read only memory 72 or ROM for short, a random access memory 73 or RAM for short, and an electrically eraseable programmable read only memory 74 or EEPROM for short, all of which are operatively connected to the key input unit 10, to the character generator 8 and also to the other elements through a system bus 75. It is to be noted that the EEPROM 74 may be replaced by a RAM with a battery backup. The CPU 71 is in charge of the overall control of the present facsimile machine. The ROM 72 stores a system program and the RAM is a work memory for storing various data under the control of the CPU 71. The EEPROM 74 is a memory which corresponds to the telephone number and individual character information memory 9 shown in FIG. 1.

Figure 3:
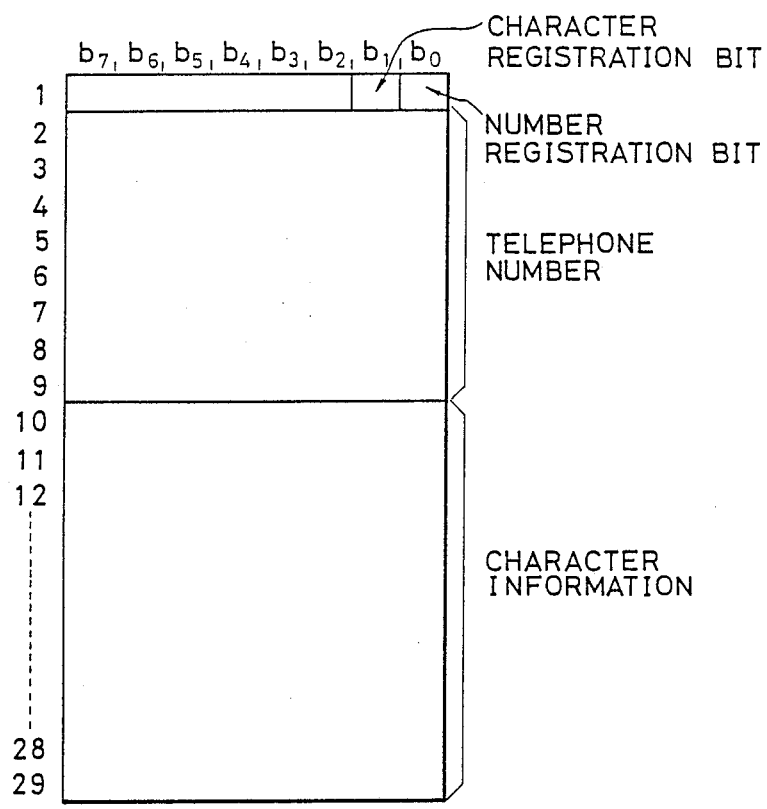
FIG. 3 is an illustration showing one example of a management table defined in the EEPROM 74 shown in FIG. 2.

FIG. 3 illustrates one example of a management table of the telephone number and individual character information memory 9 defined in the EEPROM 74. That is, in the management table shown in FIG. 3, one address includes 30 bytes which are divided into three areas: a 1st area comprised of the first byte, a second area comprised of the 2nd through 9th bytes and a third area comprised of the 10th through 29th bytes. In this example, a management table comprised of 30 bytes for one destination, which is selected by the depression of a corresponding one-touch key or of a corresponding abbreviated code number, is prepared.

The 1st byte of this management table is an area for indicating whether the table is valid or not. In the first byte, a number registration bit $b_0$ indicates the presence or absence of a registered number in this table and a character registration bit $b_1$ indicates the presence or absence of a registered character. If bit $b_0$ is "0", then it indicates the fact that this table does not have a registered number, so that the contents of bit $b_1$ are neglected even if bit $b_1$ is "1". The 2nd through 9th bytes define the area for storing a facsimile telephone number of a desired destination station, and, in the illustrated embodiment, a facsimile telephone number up to 16 digits may be stored in the form of BCD code. In addition, the 10th through 29th bytes define the area for storing character information, such as name and address, indicating the identity of the corresponding destination station, and the character information up to 20 characters in the case of the eight unit codes of the Japanese Industrial Standards can be stored.

An address is assigned to each of such management tables. For example, the management table of destination information for destination No. 1 is stored in addresses starting from address F000H over addresses of 29 bytes worth, and the management table of destination information for destination No. 2 is stored in addresses starting from address F01EH (i.e., F000H+30D) over addresses of 29 bytes worth, et seq. It is to be noted that "H" indicates the hexadecimal representation and "D" indicates the decimal representation.

In operation, a plurality of destination information, each including a facsimile telephone number and a name (and address, if desired), is previously stored in the telephone number and individual character information memory 9 in the form of the management table described above. Such a plurality of destination information is selected to be information of those destination stations to which facsimile data is often transmitted compared with the other destination stations. In storing or registering the destination information of those often used destination stations, the operator inputs the telephone number and character information, such as a name of the destination station, by using the input keys provided in the key input unit 10.

When it is desired to transmit an original document to a particular destination station, the corresponding one of a plurality of one-touch keys provided in the key input unit 10 is depressed selectively, or the corresponding one of a plurality of abbreviated code numbers is input by the numeric keys of the key input unit 10. For example, when one of the one-touch keys is depressed, the corresponding telephone number is read out of the corresponding management table of FIG. 3 and places a call to the destination station via a transmission line, such as public telephone line. At the same time, the corresponding character information is read out of the management table in the memory 9 and transferred to the character generator 8. Thus, the character information is converted into facsimile image information by the character generator 8 and the thus converted facsimile image information is supplied to the buffer 4 for temporary storage therein. In the buffer 4, the facsimile image information converted from the character information is added to top of each page of facsimile image information supplied from the reading unit 5, together with the source information indicating the identity of the present facsimile machine serving as a transmitter.

Figure 4:
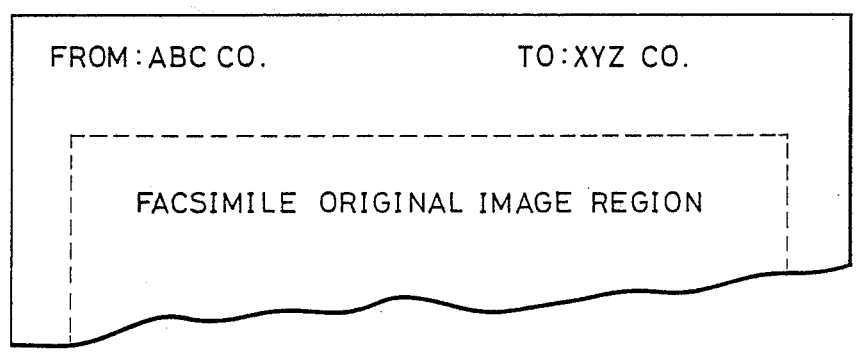
FIG. 4 is an illustration showing an example of a sheet of recording paper on which a received facsimile image is recorded by the present facsimile machine.

The thus combined facsimile image information, i.e., one page of documentary facsimile image information and the added source and destination information, is then subjected to compression by encoding at the data compression and decompression unit 3, modulated at the MODEM 2 and then transmitted to the destination station via the net control unit 1. At the destination station, which serves as a receiver and has the same structure as described with respect to and shown in FIGS. 1 through 3, there is obtained a facsimile image recorded on a recording sheet as illustrated in FIG. 4. As illustrated in FIG. 4, each page of hard copies obtained by the present facsimile machine includes source information "FROM: ABC CO." indicated at top left, destination information "TO: XYZ CO." indicated at top right, and documentary image information therebelow. It is to be noted that the example of FIG. 4 contains only the names of the source and destination stations; however, each of the source and destination information may contain any additional data, such as telephone number and address. It should also be noted that, in accordance with the present invention, each page of hard copies for recording received facsimile data has not only source station information, but also destination station information at the top, preferably in the top marginal area of each page, so that there is no need to use a transmission cover sheet unless required for some other reasons, e.g., for transmission of additional comments.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile machine comprising:
   reading means for optically reading an originally document to be transmitted;
   transmitting means for transmitting image information of said original document read by said reading means;
   storing means for storing a plurality of destination station information each of which indicates the identity of the corresponding one of a plurality of destination stations, each of said destination station information including a telephone number and arbitrarily registerable character information;
   selecting means for selecting one of said plurality of destination stations; and
   whereby, when one of said plurality of destination stations have been selected by said selecting means, at least a part of the destination station information of said selected destination station and source station information is transmitted by said transmitting means to said selected destination station prior to transmission of said image information so that said character information is printed on each page when said transmitted image information is printed at said selected destination station.

2. The facsimile machine of claim 1, wherein said transmitting means transmits at least a part of the destination station information of said selected destination station and source station information to said selected destination station each time prior to transmission of each page of said image information.

3. The facsimile machine of claim 1, wherein said destination station information includes a facsimile telephone number and character code data.

4. The facsimile machine of claim 3, wherein said character code data represents a name.

5. The facsimile machine of claim 3, further comprising a character generator interposed between said storing means and said transmitting means whereby said character code data is converted into character pattern image data by said character generator before being transmitted by said transmitting means.

* * * * *